W. H. MARTIN.
RECEIVING DEVICE FOR SIGNALING SYSTEMS.
APPLICATION FILED JAN. 17, 1920.
1,413,753.
Patented Apr. 25, 1922.
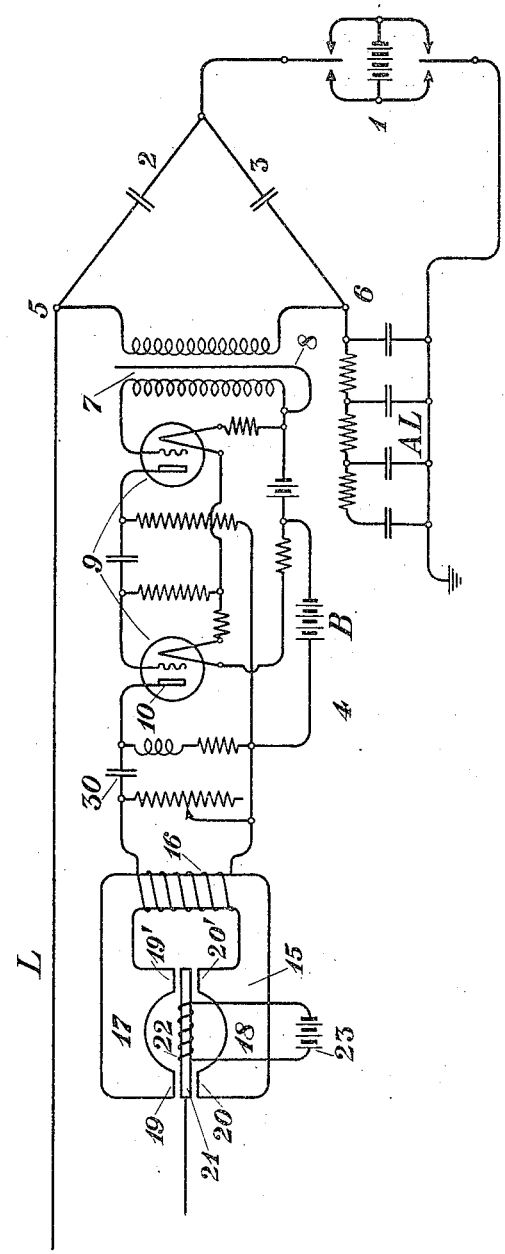
INVENTOR.
W. H. Martin
BY
ATTORNEY

UNITED STATES PATENT OFFICE.

WILLIAM H. MARTIN, OF NEW YORK, N. Y., ASSIGNOR TO AMERICAN TELEPHONE AND TELEGRAPH COMPANY, A CORPORATION OF NEW YORK.

RECEIVING DEVICE FOR SIGNALING SYSTEMS.

1,413,753.     Specification of Letters Patent.     Patented Apr. 25, 1922.

Application filed January 17, 1920. Serial No. 351,990.

*To all whom it may concern:*

Be it known that I, WILLIAM H. MARTIN, residing at New York, in the county of Bronx and State of New York, have invented certain Improvements in Receiving Devices for Signaling Systems, of which the following is a specification.

This invention relates to signaling systems, and particularly to the receiving circuits of telegraph lines. In ocean cable work, it has long been common to use a siphon recorder for receiving signals because of its ability to record minute received currents. These recorders, as is well known, comprise a permanent magnet giving a strong magnetic field within which a coil, through which the received current passes, is mounted to oscillate, the oscillations of the coil serving to move the siphon pen over the recording strip. In recent developments using vacuum tube amplifiers on cable receiving circuits, it has been found that the ordinary siphon recorder does not cooperate well with the amplifiers because of the fact that its impedance is low, being largely resistance, and of the order of about 500 ohms. For efficient operation a device in the output circuit of a vacuum tube amplifier should have a much higher impedance. It is, of course, possible to place more turns on the moving coil of the siphon recorder in order to obtain a higher impedance, but there are two important limitations to the increase which can be obtained in this way; i. e., the minimum size of wire which can be used, and the increased weight of the coil. It is the object of the present invention to provide a receiving circuit of the character above indicated in which the impedance of the receiving device is adapted to the output circuit of the vacuum tube amplifier.

The accompanying drawing illustrates diagrammatically one embodiment of the invention. The transmission line or cable circuit is indicated at L and the balancing artificial line for permitting duplex operation, at A1. The transmitting device 1 is connected between the real and artificial lines through the ratio arms 2 and 3 as usual, and the receiving circuit, indicated generally 4, is connected across the extremities of the ratio arms between the real and artificial lines at the points 5 and 6. The receiving circuit is here shown as comprising a transformer 7, provided with a shield 8 for preventing the capacity effect of its windings from influencing the received signals, with the secondary circuit of the transformer feeding a two-stage amplifier 9 of a well-known form requiring no detailed description.

The receiving device 15 here shown diagrammatically as a siphon recorder is connected in the output circuit of the second amplifier 10. Instead of using a permanent magnet as in the ordinary siphon recorder, a soft iron core which will not become permanently magnetized is used, preferably of substantially the form indicated in the drawing, and upon this is wound a coil 16 in such a way as to give opposite poles at 17 and 18; each of these poles having preferably two projections 19—19' and 20—20'. An armature 21 is provided to oscillate between the poles 17 and 18 and to move the recording member of the device. This magnet may be a permanent magnet or may be magnetized by a coil such as indicated at 22, fed by a battery 23, or polarized in any other convenient manner as, for instance, by passing the received current through a coil on the magnet as well as through the coil 16.

By thus arranging the recording device, the impedance of the coil 16 may be made almost anything within reasonable limits, so that the desired high impedance necessary to operate efficiently the output circuit of the tube 10 may be attained. In order to prevent the current from the output battery B of the amplifier tubes from flowing through the coil 16 of the receiving device, it is necessary to place the condenser 30 in the output circuit of the tube 10, and in order to maintain the high time constant necessary to the proper operation of the recording device, it is essential that the capacity of this condenser be large, or that the resistance of the receiving circuit be high. It is obvious, therefore, that by making the impedance of the device itself high as herein described, the condenser 30 may be substantially reduced in size, which is an added advantage flowing from the present arrangement.

It is manifest that various modifications of the details of the siphon recorder here illustrated may be made, without departing in any way from the invention herein described and claimed. It is obviously immaterial, for instance, what the character of the magnet 21 is, or how it is mounted to move within the magnetic field, or how it is biased to its zero position; also it is obvious that the field itself may be produced by various arrangements of the coil 16.

What I claim is:

In a signal transmitting system, a receiving circuit including a vacuum tube amplifier, a receiving device having stationary and movable coils, a circuit directly connecting said stationary coil with the output circuit of the amplifier, said stationary coil having an impedance comparable in value to the impedance of the output circuit of the vacuum tube.

In testimony whereof, I have signed my name to this specification this 15th day of January, 1920.

WILLIAM H. MARTIN